(12) United States Patent
Hirotsune et al.

(10) Patent No.: US 6,756,985 B1
(45) Date of Patent: Jun. 29, 2004

(54) IMAGE PROCESSOR AND IMAGE DISPLAY

(75) Inventors: Satoshi Hirotsune, Settsu (JP); Tsutomu Muraji, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/333,583

(22) Filed: Jun. 15, 1999

(30) Foreign Application Priority Data

Jun. 18, 1998 (JP) .......... 10-171116
Mar. 9, 1999 (JP) .......... 11-061510

(51) Int. Cl.[7] .......... G06T 15/00
(52) U.S. Cl. .......... 345/501; 345/530; 345/565; 345/659
(58) Field of Search .......... 345/501, 530, 345/545, 649, 565, 659

(56) References Cited

U.S. PATENT DOCUMENTS 5,604,825 A * 2/1997 Hirota et al. .......... 382/261
5,608,824 A   3/1997 Shimizu et al.
5,764,311 A * 6/1998 Bonde et al. .......... 348/746
5,892,518 A * 4/1999 Mizobata et al. .......... 345/474

FOREIGN PATENT DOCUMENTS

| EP | 0777198 | 6/1997 |
| JP | 4-190391 | 7/1992 |
| JP | 6-176140 | 6/1994 |

* cited by examiner

Primary Examiner—Matthew C. Bella
Assistant Examiner—Mackly Monestime
(74) Attorney, Agent, or Firm—Smith, Gambrell & Russell, LLP

(57) ABSTRACT

An image processor having a frame memory for storing image data to newly generate purposed image data to be displayed by processing the image data in the frame memory, in which a processing memory for previously storing reference pixel coordinates for processing the image data is included and the data for the reference pixel coordinates in the processing memory is provided for the frame memory as an image-data read address.

11 Claims, 15 Drawing Sheets

Liquid-crystal-panel surface

Screen surface

IMAGE PROCESSOR AND IMAGE DISPLAY

BACKGROUND OF THE INVENTION

1. Field of the Invention

The present invention relates to an image processor for processing image data and newly generating purposed image data to be displayed and an image display.

2. Description of the Related Art

In general, a projection display M such as a projection TV is mounted on a base B at a predetermined elevation angle θ to project the light emitted from the display M on a screen S a predetermined distance L away from the display M.

Heretofore, a display for directly projecting the light of a CRT on a screen has been generally used so far for the projection display M. However, a display is recently used which uses a pixel structure such as a liquid-crystal panel or plasma display panel as a light bulb.

In this case, if the projection display M is set with the surface upward, a distorted image A1 like a trapezoid with a long upper side is formed when projecting an originally-rectangular normal image A0 on the display panel of the display M on the screen S as shown in FIG. 11(a) and thereby, it is difficult to see the image A1.

Accordingly, it is necessary to display the normal image A0 on the screen S by correcting the distortion of such an image A1.

Therefore, as shown in FIG. 11(b), by previously deforming the normal image A0 to obtain an image A2 like a trapezoid with a long bottom side and projecting the image A2 on the screen S, the normal rectangular image A0 is displayed.

Thus, such a technical idea as to form the image A2 obtained by previously deforming the normal image A0 for distortion correction (hereafter, this processing is referred to as inverse correction) makes it possible to easily perform inverse correction and relatively easily correct the distortion of an image because a display such as a conventional CRT does not have any pixel structure and thereby, an image is deformed by changing the magnetic field of a deflecting coil.

However, as for the projection display M provided with a display panel having a pixel structure of liquid crystal or plasma, it is difficult to obtain the inversely-corrected image A2 unless a video signal is digitally image-processed.

In this case, to form the image A2 obtained by inversely correcting the normal image A0 it is necessary to rewrite the data present at a certain coordinate position Q to other coordinate position P, as shown in FIG. 11(b).

In this case, the relation between the both coordinate positions Q and P can be logically obtained by using a geometric relation based on such setting conditions as the elevation angle θ and the projection distance L of the projection display M. Therefore, a transformation formula led from the geometric relation will be slightly described below by referring to FIGS. 12(a) and 12(b). That is, in FIGS. 12(a) and 12(b), it is assumed that the enlargement magnification of the display size on a screen surface 1202 is k, the projection distance is L, and the elevation angle is θ on the basis of the size of a liquid-crystal panel surface 1201. Moreover, when it is assumed that the coordinates of a point P on the liquid-crystal panel surface is P(x,y) and the coordinates of a point Q on the screen surface is Q(X,Y), the transformation formula between the points P and Q is shown as the following expression (Equation 1). In this case, the vertical/horizontal inversion phenomenon due to a lens system is not considered.

$$Y(y) = L \cdot k \cdot y / (L \cdot \cos\theta - k \cdot y \cdot \sin\theta)$$

$$X(x) = \{L \cdot \cos\theta / (L \cdot \cos\theta - k \cdot y \cdot \sin\theta)\} \cdot k \cdot x \quad \text{[Equation 1]}$$

However, when a frame memory for storing a video signal can store data only in pixel unit and a display panel has a pixel structure, data can be displayed only in pixel unit. Therefore, when the value of the coordinate position P obtained through a simple logical computation has a fraction lower than a decimal point, the obtained coordinate position P does not match with a position where an actual pixel is present on a display panel.

Therefore, as shown in FIG. 13, the point P is set as a coordinate position where a display pixel is actually present on the display panel to conversely obtain the coordinate position of the point Q on the basis of the point P. In this case, because the coordinate position Q is a value merely obtained through computation, it does not always fit the coordinate position on a pixel of the frame memory and therefore, it may be shifted from coordinate positions Q1, Q2, . . . of actual pixels. Thus, actual data is not present on the coordinate position Q.

Therefore, in this case, coordinate positions Q1 to Q4 of peripheral pixels (four pixel in this case) are obtained from the coordinate position Q (hereafter, the coordinate positions Q1 to Q4 are referred to as reference pixel coordinates) to generate the data at the coordinate position of the point Q in accordance with the actual data stored in the reference pixel coordinates Q1 to Q4 (hereafter, the above data interpolation is referred to as filtering).

For example, when assuming pixel data values on the reference pixel coordinates Q1 to Q4 as D1 to D4, the data D on the coordinate position Q necessary for inverse correction is computed in accordance with the following expression (Equation 2).

$$D = a1 \cdot D1 + a2 \cdot D2 + a3 \cdot D3 + a4 \cdot D4 \quad \text{[Equation 2]}$$

where a1 to a4 denote filter coefficient (weighting coefficient) and satisfy the relation of the following expression (Equation 3).

$$a1 + a2 + a3 + a4 = 1 \quad \text{[Equation 3]}$$

When the data D on the coordinate position Q is made through filtering, it is possible to display an image by rewriting the data D to the coordinate position P and inversely correcting the image.

By performing the filtering for all pixels, the inversely-corrected image A2 can be obtained on the display panel. Therefore, by projecting the image A2 on the screen S, the normal image A0 free from distortion is projected.

FIG. 14 is a block diagram showing the configuration of a conventional projection display D having a function for correcting the above distorted image, particularly that of an image processing circuit provided with a liquid-crystal panel serving as a light bulb.

In FIG. 14, symbol 81 denotes an DA converter for converting an input video signal into a digital value, 82 denotes a DA converter for converting a video signal into an analog value and outputting it, 83 and 84 denote RAMs for storing video-signal data, and 85 denotes a computing circuit for image-processing a video signal and controlling various sections.

A pair of RAMs 83 and 84 is used because, while data is transferred to one RAM such as the RAM 83 from the AD converter 81, the computing circuit 85 cannot access the RAM 83 and therefore, the other RAM 84 is provided and the circuit 85 accesses the other RAM 84 so that the AD converter 81 and computing circuit 85 can apparently make an access at the same time.

In the above configuration, an input video signal is converted into a digital value by the AD converter 81 and its image data is written in the RAM 83 or 84.

The computing circuit 85 reads image data from the RAM 83 or 84, inversely corrects the image data, and writes the inversely-corrected image data in the RAM 83 or 84 again. Then, the circuit 85 transfers the inversely-corrected image data to the DA converter 82 from the RAM 83 or 84 and outputs an inversely-corrected video signal from the DA converter 82.

FIG. 15 is a flow chart showing the image processing procedure by the computing circuit 85.

Setting conditions such as the elevation angle θ shown in FIG. 10 and the projection distance L are previously inputted (step 1). It is enough to perform the above operation only one time when setting the projection display D.

Then, the pointer showing a pixel is initialized (hereafter referred to as output pixel pointer initialization) (step 2).

In this case, an output pixel pointer designates pixels from the leftmost pixel 801a of the top line 801 up to the rightmost pixel 802a of the bottom line 802 as for the image A0 shown in FIG. 11 one pixel by one pixel similarly to the case of the raster scan of a TV. Therefore, initialization is performed so as to point the leftmost pixel of the top line.

Then, it is decided in accordance with the value of the output pixel pointer whether the pixel processing for one frame is completed. Unless the image processing for one frame is completed, image processing routines in steps 4 and 5 are started. However, when the image processing for one frame is completed, step 2 is restarted in order to display the next frame.

When it is decided in step 3 that the image processing for one frame is not completed yet, the computing circuit 85 computes reference pixel coordinates and filter coefficients on the basis of the setting condition inputted at step 1 (step 4) For example, when the output pixel pointer specifies the pixel present at the coordinate position of the point P as for the case in FIG. 15, the circuit 85 computes the reference pixel coordinates Q1 to Q4 and the filter coefficients a1 to a4.

Then, the circuit 85 means the data on a coordinate position necessary for inverse correction in accordance with the data present at the reference pixel coordinates. That is, the circuit 85 performs filtering (step 5). For example, as for the case in FIG. 15, the circuit 85 computes the data D on the coordinate position Q necessary for inverse correction by using the filter coefficients al to a4 in accordance with the data values D1 to D4 of the peripheral reference pixel coordinates Q1 to Q4 as shown by the above (Equation 2).

Then, the circuit 85 rewrites the data D to a predetermined coordinate position necessary for inverse correction on the RAM 83 or 84. For example, as for the case in FIG. 15, the circuit 85 writes the data D obtained at the coordinate position Q in the coordinate position of the point P and then, restarts step 3.

However, because the above case shows a configuration in which the computing circuit 85 performs every processing shown by the flow chart in FIG. 15 by means of hardware, there are problems that very large hardware is necessary and thereby, the cost increases and the system is increased in size though the deterioration of image quality does not occur in which a frame rate lowers and thereby movement becomes irregular even in performing very-fine dynamic-image processing.

Moreover, the image processor of the conventional projection display has a problem that it is difficult to improve the image quality and decrease the cost at the same time for above reason.

SUMMARY OF THE INVENTION

The present invention is made to solve the above conventional problems and its object is to provide an image processor and an image display capable of preventing the cost from increasing without deteriorating any image quality.

The 1st invention of the present invention is an image processor comprising:

frame memory means for storing the pixel data for a first image;

pixel-data generation means for generating the pixel data for a second image in accordance with reference pixels on the first image; and processing-memory means for previously storing the position-coordinate data for the reference pixels determined in accordance with the relation between the first and second images;

wherein the pixel-data generation means obtains the pixel data for the reference pixels read out of the frame-memory means by using the position-coordinate data values for the reference pixels stored in the processing-memory means as read addresses and generating the pixel data for the second image in accordance with the obtained pixel data.

The 2nd invention of the present invention is an image processor according to the 1st Invention, wherein the relation between the images represents the positional relation between a predetermined position on the first image and a pixel position on the second image.

The 3rd invention of the present invention is an image processor according to the 1st Invention, wherein the relation between the images represents the positional relation between a predetermined position on the first image and a pixel position on the second image, the reference pixels represent four pixels closest to and around the predetermined position, and generation of the pixel data for the second image represents generating the pixel data for a pixel position on the second image in accordance with the pixel data for the four pixels. The 4th invention of the present invention is an image processor according to the 1st invention, wherein the processing-memory means stores weighted coefficients for determining rates for using the pixel data values for reference pixels readout of the frame-memory means by making the rates correspond to the position-coordinate data values for the reference pixels, and the pixel-data generation means is provided with filter means for generating the pixel data for the second image by using the pixel data values for the reference pixels and the weighted coefficients read out of the processing-memory means.

The 5th invention of the present invention is an image processor according to the 2nd invention, wherein the position-coordinate data values for the reference pixels are substantially simultaneously read out of the processing-memory means and the weighted coefficients are substantially simultaneously read out of the processing-memory means.

The 6th invention of the present invention is an image display comprising:

frame-memory means for storing the pixel data for a first image;

pixel-data generation means for generating the pixel data for a second image in accordance with reference pixels on the first image;

display means for displaying the generated second image; and processing-memory means for previously storing the position-coordinate data for the reference pixels determined in accordance with the relation between the first and second images;

wherein the pixel-data generation means obtains the pixel data for the reference pixels read out of the frame-memory means by using the position-coordinate data values for the reference pixels stored in the processing-memory means as read addresses and generates the pixel data for the second image in accordance with the obtained pixel data.

The 7th invention of the present invention is an image display according to the 6th invention, wherein the relation between the images represents the positional relation between a predetermined position on the first image and a pixel position on the second image, the reference pixels are four pixels closest to and around the predetermined position, and generation of the pixel data on the second image represents generating the pixel data for the pixel position on the second image in accordance with the pixel data for the four pixels.

The 8th invention of the present invention is an image display according to the 6th invention, wherein the processing-memory means stores weighted coefficients for determining the rates for using the pixel data values for reference pixels read out of the frame-memory means by making the rates correspond to the position-coordinate data values for the reference pixels, and the pixel-data generation means is provided with filter means for generating the pixel data for the second image by using the pixel data values for the reference pixels and weighted coefficients read out of the processing-memory means.

The 9th invention of the present invention is an image display according to the 6th invention, wherein the display means is a projection display.

The 10th invention of the present invention is an image display according to the 6th invention, wherein the display means has a dot-matrix structure.

The 11th invention of the present invention is an image display according to the 6th invention, wherein the second image is an image obtained by trapezoid-transforming the first image.

The 12th invention of the present invention is an image display according to the 6th invention, wherein the reference pixel is a pixel on the first image corresponding to a position in a region designated on an image displayed by the display means, and the pixel data for the second image is data used to display the image in the predetermined region in a region enlarged more than the designated region.

The 13th invention of the present invention is a medium having recorded thereon a program which is executed by a computer to implement functions of all or part of the means described in any one of the 1st invention to the 12th invention.

DESCRIPTION OF THE PREFERRED EMBODIMENTS

The preferred embodiments of the present invention will be described below by referring to the accompanying drawings.

Embodiment 1

Figure 1:
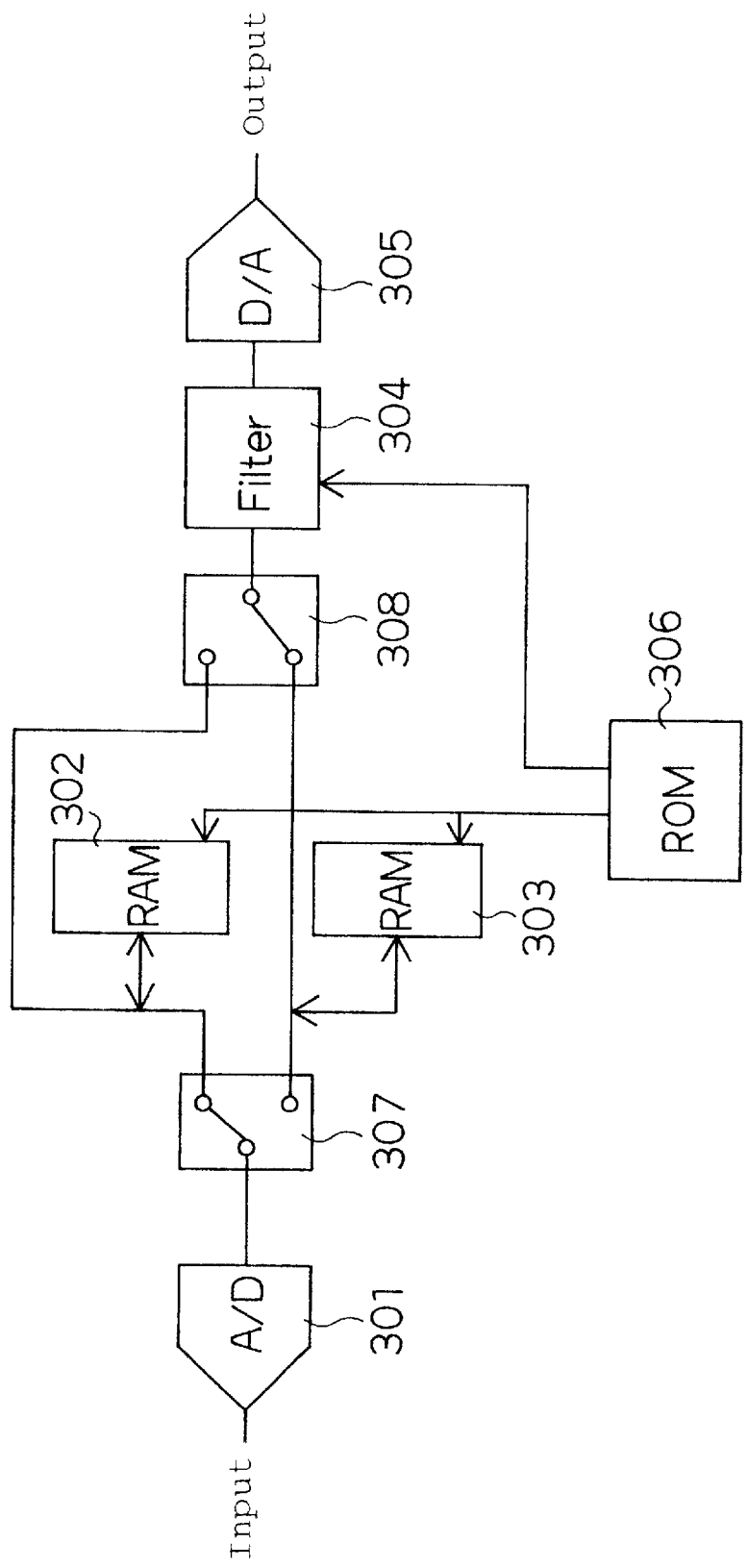
FIG. 1 is a block diagram showing the portion of an image processing circuit of the projection display of the embodiment 1 of the present invention.

FIG. 1 is a block diagram showing the image processing circuit of the projection display of this embodiment provided with a display panel having a pixel structure such as liquid crystal or plasma. The configuration of this embodiment will be described below by referring to FIG. 1.

That is, in FIG. 1, symbol 301 denotes an AD converter, 302 and 303 denote frame memories, 304 denotes a filter, 305 denotes a DA converter, 306 denotes a ROM serving as a processing memory, 307 denotes a switch for switching write buses, and 308 denotes a switch for switching read buses.

This embodiment is provided with two frame memories 302 and 303 because RAMs are used which cannot perform both read and write at the same time. That is, when one RAM is kept in the write state, the other RAM is kept in the read state. Therefore, the switches 307 and 308 are complementarily operated. For example, when the switch 307 selects one RAM 302 (or 303) to allow data write, the switch 308 selects the other RAM 303 (or 302) to allow data read.

When a memory uses a biport memory capable of performing data write and data read in parallel at the same time, it is enough to use only one biport memory. In this case, the switches 307 and 308 can be omitted.

Reference pixel coordinates and values for all pixels of filter coefficients are previously registered in the ROM 306, which are obtained in accordance with the setting conditions when a projection display is set to a certain elevation angle θ and projection distance L.

Figure 13:
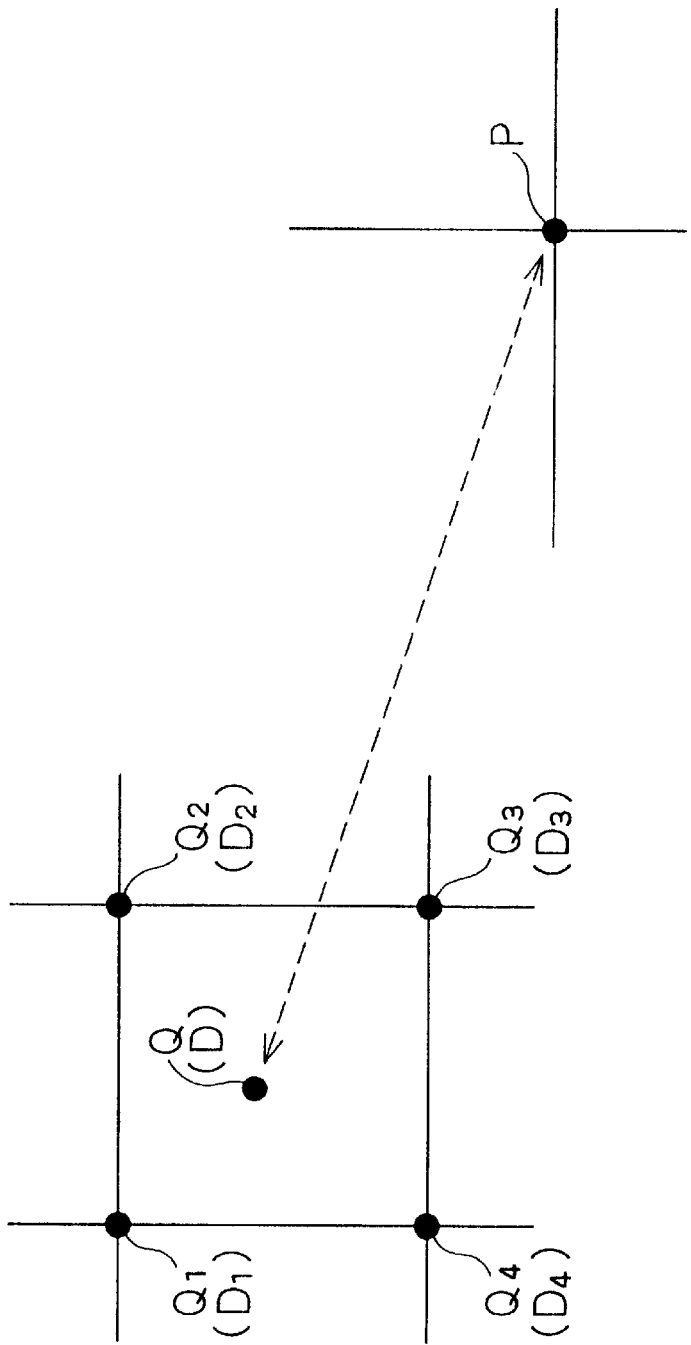
FIG. 13 is an illustration showing the relation between reference pixel coordinates for obtaining an inversely-corrected image.
Figure 14:
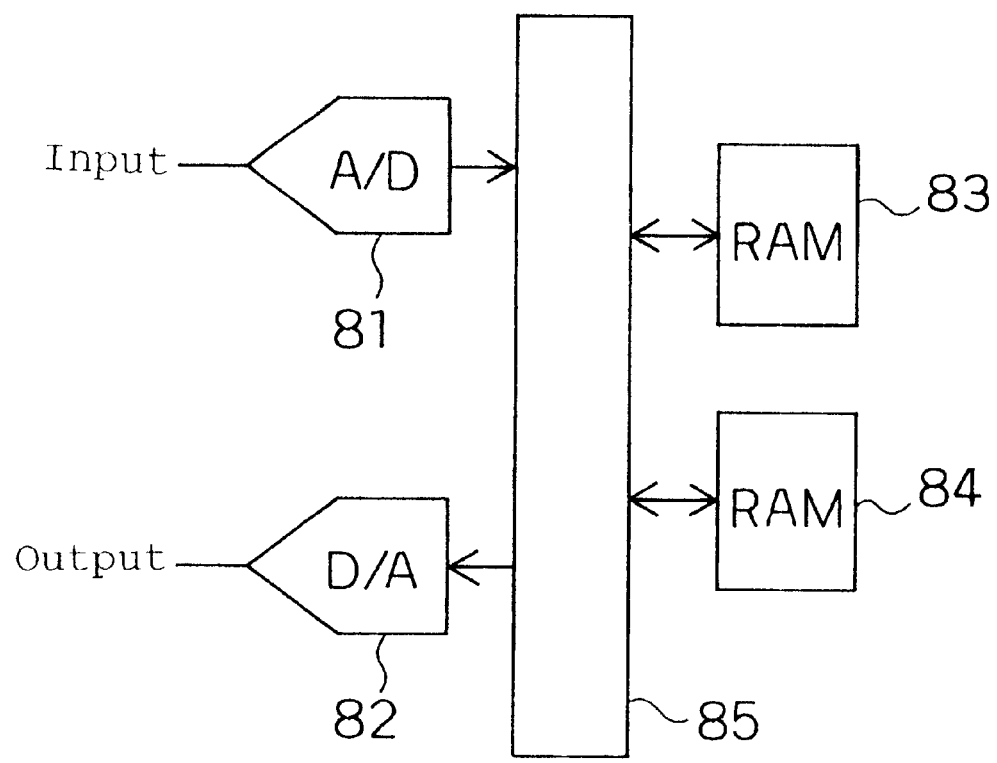
FIG. 14 is a block diagram showing the portion of the image processing circuit of a conventional projection display.

That is, a coordinate position necessary for inverse correction is previously computed for every pixel at the design stage. Then, reference pixel coordinates serving as peripheral pixels are determined in accordance with the integer part of the coordinate position and a filter coefficient is computed in accordance with the decimal part of the coordinate position. For example, as for the case shown in FIG. 13, the reference pixel coordinates Q1 to Q4 and filter coefficients a1 to a4 corresponding to the coordinate position of a certain point P are obtained. Then, the reference pixel coordinates and filter coefficients are stored in the ROM 306. Data values D1 to D4 are denoted by the reference pixel coordinates Q1 to Q4 and supplied from the RAM 302 or RAM 303.

Then, a method for obtaining peripheral pixels of a reference pixel and a filter coefficient according to the direct interpolation method will be described below by referring to FIG. 3.

Figure 3:
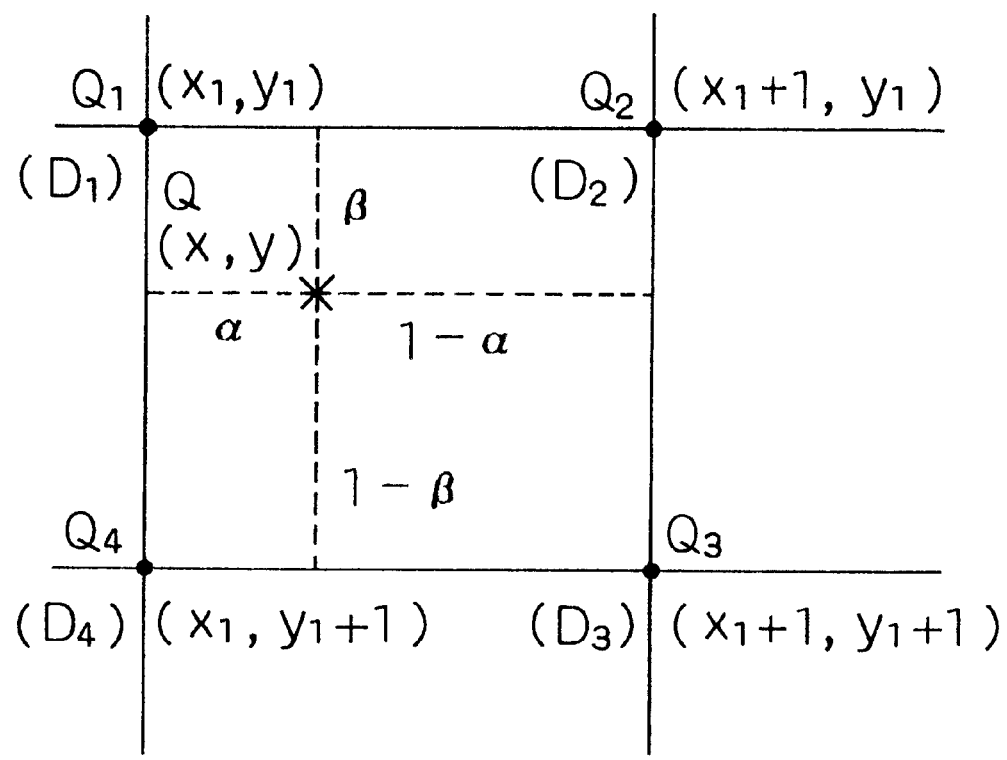
FIG. 3 is an illustration for explaining a method for obtaining peripheral pixels of a reference pixel and a filter coefficient using the linear interpolation method in the embodiment 1 of the present invention.

FIG. 3 is an illustration showing the relation between reference pixel coordinates for explaining the method for obtaining peripheral pixels of a reference pixel and filter coefficients according to the direct interpolation method.

As shown in FIG. 3, when assuming the pixel values on the coordinates of the points Q1 to Q4 as D1 to D4, the pixel value D at the position of coordinates Q(x,y) is obtained by the following expression (Equation 4) when using the direct interpolation method.

$$D = \{D1(1-\alpha) + D2 \cdot \alpha\}(1-\beta) + \{D4(1-\alpha) + D3 \cdot \alpha\}\beta \quad \text{[Equation 4]}$$
$$= (1-\alpha)(1-\beta)D1 + \alpha(1-\beta)D2 + \alpha \cdot \beta D3 + (1-\alpha)\beta D4$$

Where,
$\alpha = x - x1$
$\beta = y - y1$

Moreover, similarly to the relation described for (Equation 3), the following relation of (Equation 5) is effectuated.

$$(1-\alpha)(1-\beta) + \alpha(1-\beta) + \alpha \cdot \beta + (1-\alpha)\beta = 1 \quad \text{[Equation 5]}$$

Then, it is described below that a pixel position is selected at the integral part of the coordinates Q(x,y) and a filter coefficient is determined at the decimal part of the coordinates Q(x,y).

At the coordinates Q(x,y) for obtaining a pixel value, the integral part of x becomes x1 and the integral part of y becomes y1.

That is, the pixel of the point Q1(top left in FIG. 3) can be selected as a pixel closest to the integral part of the coordinates Q(x,y). Moreover, the decimal parts of the coordinate values x and y become $x - x1 = \alpha$ and $y - y1 = \beta$. It is found that these values serve as coefficient parts of the pixel values D1 to D4 in the Equation 4.

Therefore, as for this embodiment, the coefficient part of the expression 4 directly serves as the filter coefficients a1 to a4 of the filter 304.

Then, explanation of the configuration will be restarted to describe the filter 304 of this embodiment below.

Figure 2:
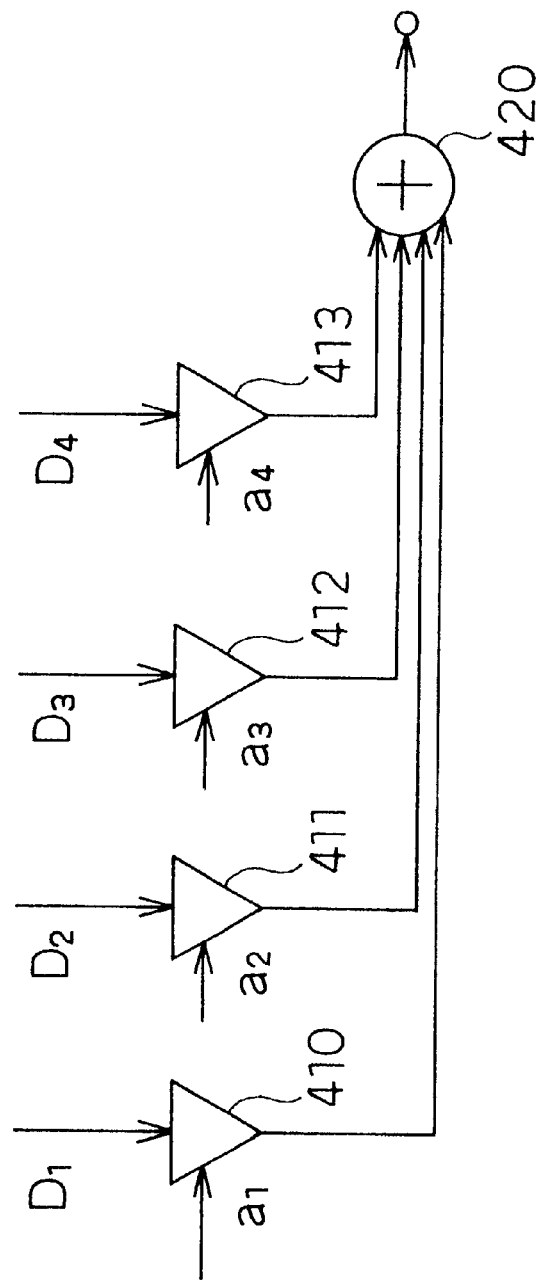
FIG. 2 is a block diagram showing a specific configuration of the filter of the circuit in FIG. 1.

The filter 304 is configured by a digital filter as shown in FIG. 2.

That is, in case of this embodiment, the filter 304 performs the operation shown by the expression (4) and comprises four multipliers 410 to 413 and one adder 420 so that the filter coefficients a1 to a4 of the multipliers 410 to 413 are supplied from the ROM 306.

Then, the flow of a video signal in the projection display having the configuration in FIG. 1 will be described.

An input video signal is converted into a digital value by the AD converter 301 and then, written in the frame memory 302 or 303.

As for the frame memory 302 or 303, write state and read state are switched every frame by the selector switch 307 or 308.

Read addresses of the frame memories 302 and 303 are outputted from the ROM 306. That is, to generate the data present at a coordinate position for inverse correction, it is necessary to read the data at a reference pixel coordinates (for four pixels) around the coordinate position. Therefore, addresses for four pixels are outputted from the ROM 306 by four cycles and thereby, data values for the four pixels are successively read out of the frame memory 302 or 303 and supplied to the filter 304 through the selector switch 308.

At the same time, filter coefficients are also read out of the ROM 306 and supplied to the filter 304. Therefore, the filtered data D on the coordinates Q(x,y) is supplied from the filter 304 to the DA converter 305 and thereby, a video signal to be outputted to the display panel is generated.

The AD converter 301 can be omitted when handling a digital video signal and the DA converter 305 can be omitted when using a digital-input liquid-crystal panel. Moreover, in the case of multiple channel such as RGB color display, it is enough to prepare a circuit common to each channel.

As for this embodiment 1, because reference pixel coordinates requiring a lot of operation time are previously computed to store the reference pixel coordinates and a filter coefficient corresponding to the coordinates in the ROM 306, filtering can be performed within the access time of the ROM 306. Therefore, a very-fine dynamic image can be processed without deteriorating the image quality and various image transformations such as enlargement and contraction can be made only by changing the reference pixel coordinates.

Moreover, it is possible to greatly decrease the cost because large hardware for computing reference pixel coordinates is unnecessary.

Embodiment 2

Figure 4:
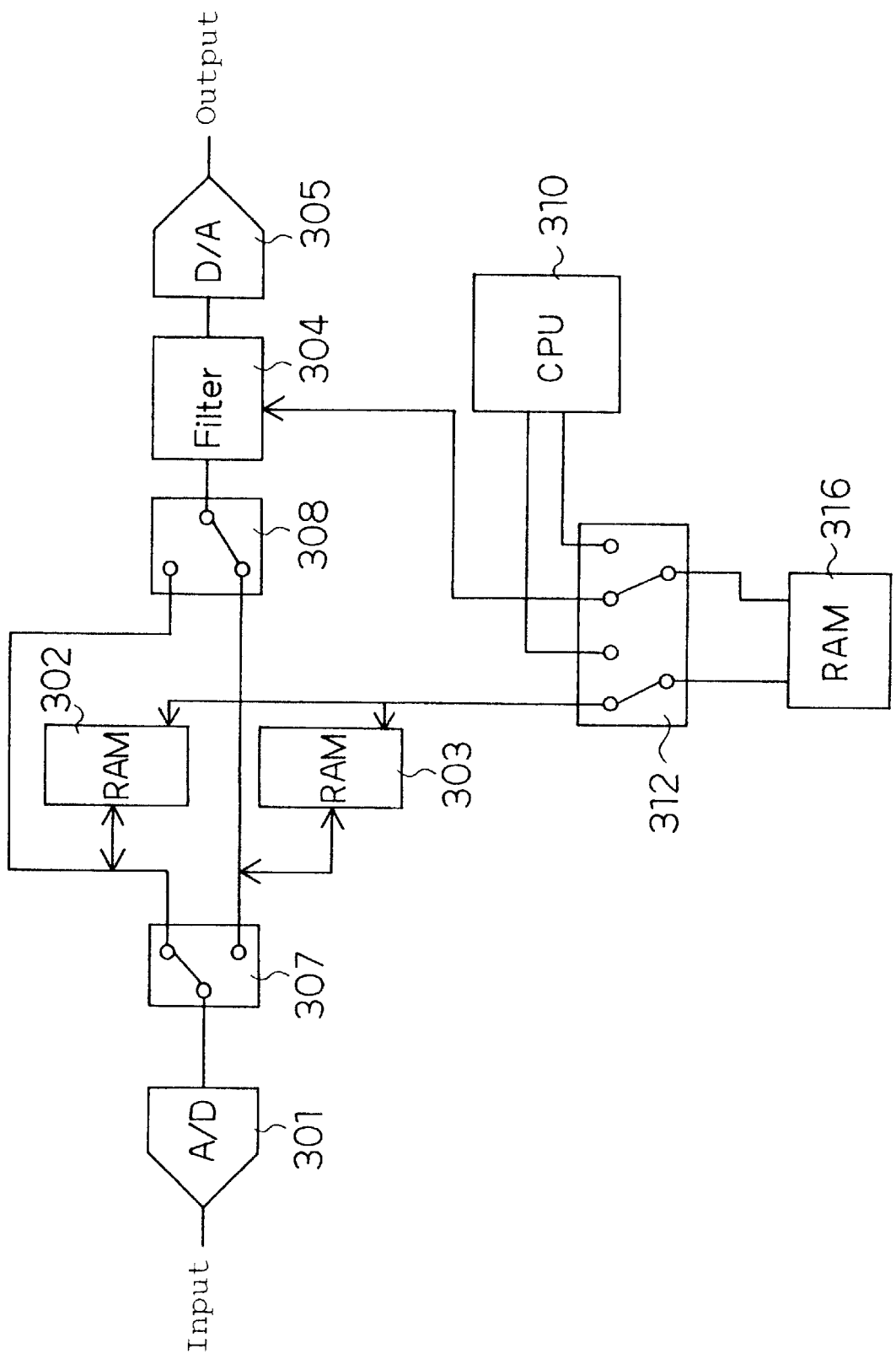
FIG. 4 is a block diagram showing the portion of an image processing circuit of the projection display of the embodiment 2 of the present invention.

FIG. 4 is a block diagram showing the image processing circuit of the projection display of the embodiment 2 of the present invention, in which a portion corresponding to that of the embodiment 1 shown in FIG. 1 is provided with the same symbol.

The embodiment 2 is characterized in that a RAM 316 is used as a processing memory and a CPU 310 for controlling the RAM 316 is connected through a switch 312, instead of ROM 306 with the configuration in FIG. 4.

Because other configurations are the same as the case of the embodiment 1 shown in FIG. 1, their detailed description is omitted.

Figure 10:
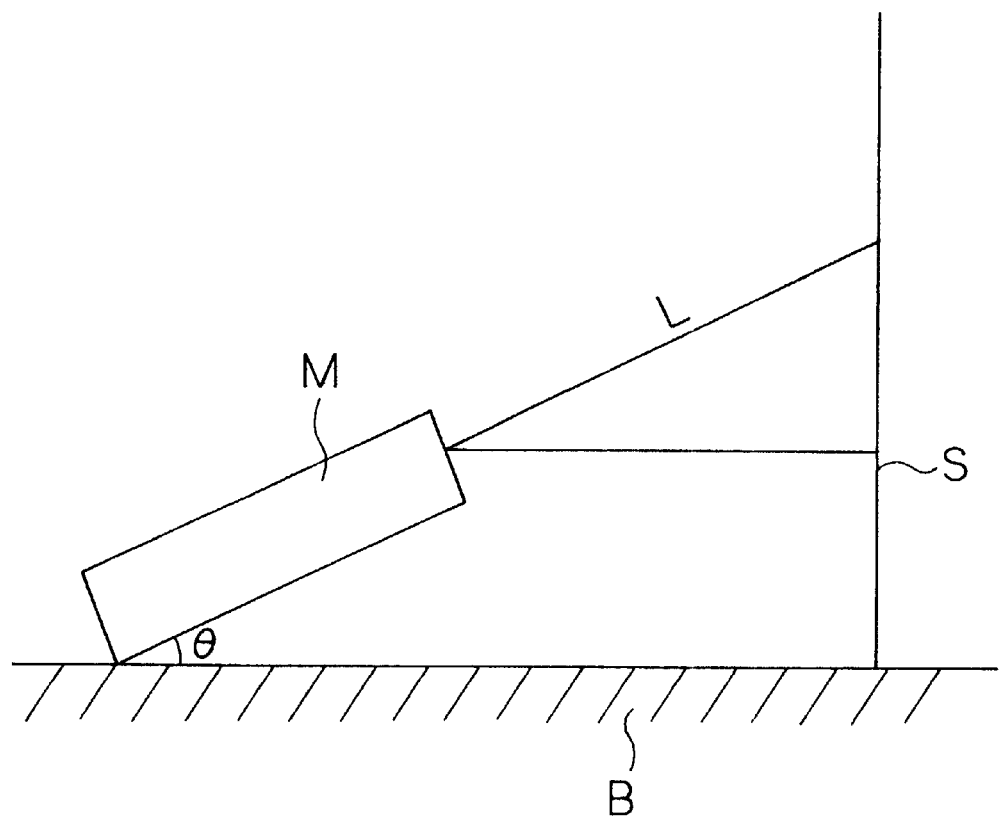
FIG. 10 is an illustration showing the state in which a projection display is set.
Figure 15:
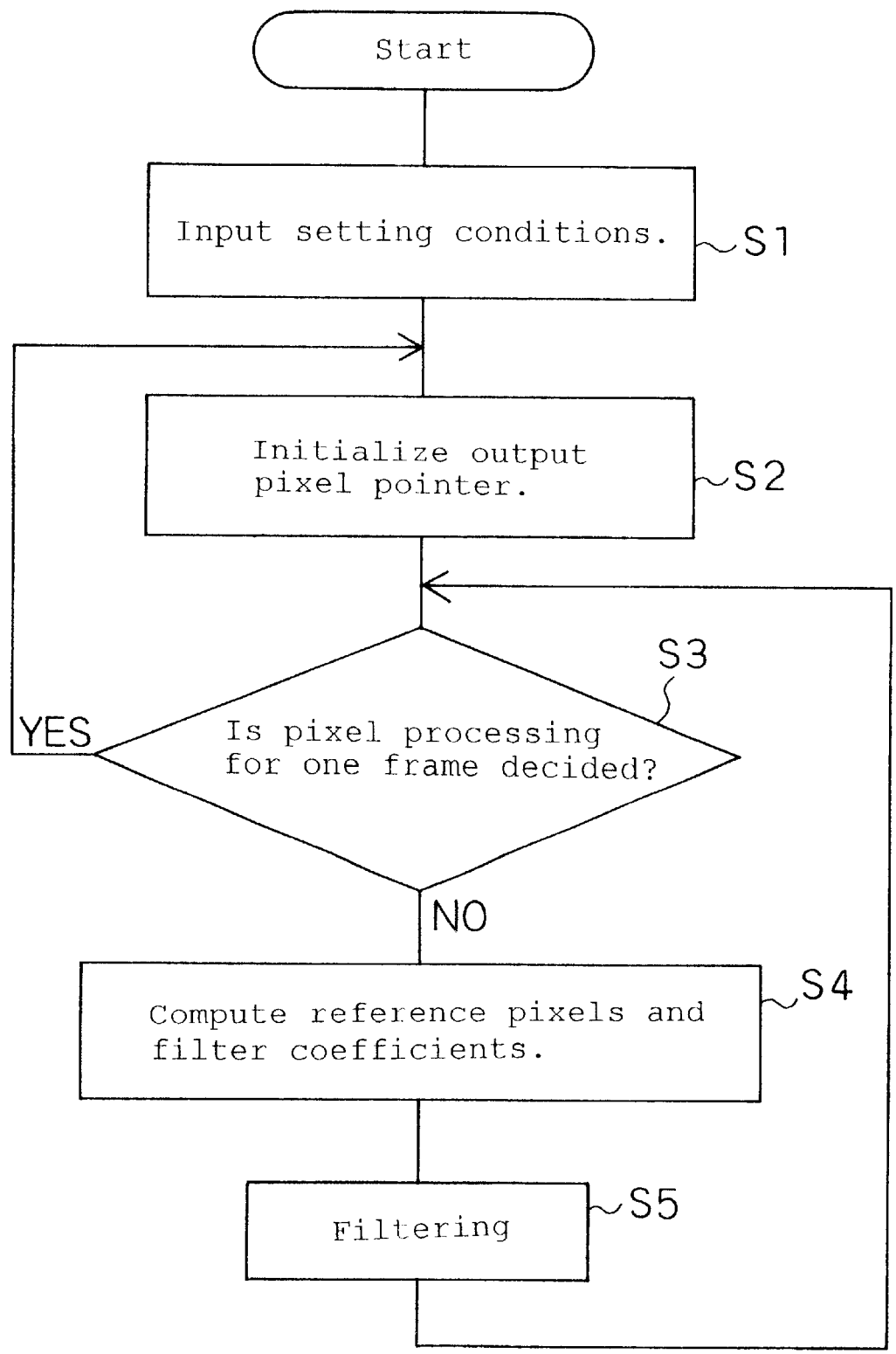
FIG. 15 is a flow chart for explaining the outline of a method for computing reference pixel coordinates and filter coefficients in the image processing circuit of the conventional projection display shown in FIG. 14.

When the setting conditions such as the elevation angle θ and the projection distance L of the projection display M shown in FIG. 10 are set, the CPU 310 previously performs the processings from step 1 to step 4 shown in FIG. 15 when this projection display is set, computes reference pixel coordinates and the filter coefficient of every pixel and writes them in the RAM 316 through the switch 312.

Then, for projection on a screen or the like, the switch 312 is switched, the RAM 316 is separated from the CPU 310 and connected to a frame memory 302 and a filter 304, the data for reference pixel coordinates outputted from the RAM 316 is supplied to the frame memories 302 and 303, and the data for filter coefficients read out of the RAM 316 is supplied to the filter 304.

Also in case of the embodiment 2, because reference pixel coordinates requiring a lot of operation time are previously computed when setting a display and stored in the RAM 316 similarly to the case of the embodiment 1, filtering can be made within the access time of the RAM 316. Therefore, a very-fine dynamic image can be processed without deteriorating any image quality.

Moreover, as for the embodiment 2, because the RAM 316 is used instead of the ROM 306 of the embodiment 1, it is possible to easily change the contents of reference pixel coordinates or a filter coefficient on the spot even if a setting condition θ or L is changed and to flexibly correspond to various image transformations such as enlargement and contraction.

Furthermore, it is possible to greatly reduce the cost because large hardware for computing reference pixel coordinates is unnecessary.

Embodiment 3

Figure 5:
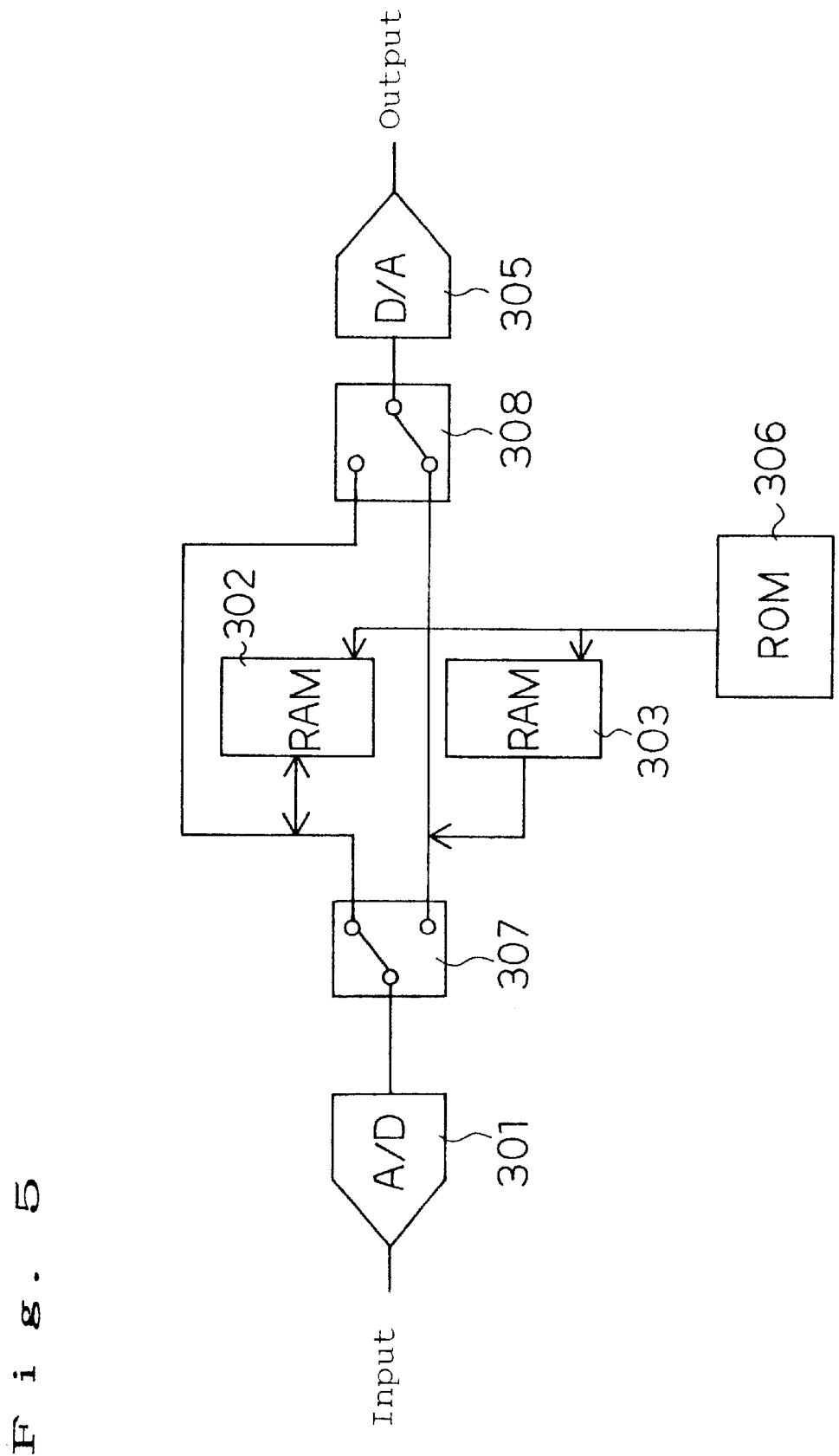
FIG. 5 is a block diagram showing the portion of an image processing circuit of the projection display of the embodiment 3 of the present invention.

FIG. 5 is a block diagram showing the image processing circuit of the liquid-crystal projection display of embodiment 3 of the present invention, in which a portion corresponding to that of the embodiment 1 shown in FIG. 1 is provided with the same symbol.

The embodiment 1 is characterized in that a filter is omitted when compared with the configuration of the embodiment 1 and only the coordinates for one pixel are stored in a ROM 306 serving as a processing memory as reference pixel coordinates corresponding to a coordinate position necessary for inverse correction instead of four peripheral pixels in case of the embodiments 1 and 2. For example, in FIG. 13, only one data value for reference pixel coordinates Q1 is stored correspondingly to a certain coordinate position Q necessary for inverse correction.

Because other configurations are the same as those of the embodiment 1 shown in FIG. 1, their detailed description is omitted.

As for the embodiment 3, an image can be processed within the access time of the ROM 306 because reference pixel coordinates requiring a lot of operation time are previously computed and stored in the ROM 306.

However, because filtering performed by the embodiment 1 is not performed, it is possible to reduce the cost by a value equivalent to simplified circuit configuration though the image quality is slightly deteriorated.

Each of the above embodiments 1 to 3 is an example of a picture processor for performing inverse correction on a projection display. However, the present invention is not restricted to the projection display. The present invention can be widely applied to image processors for processing image data based on a video signal and newly generating purposed image data to be displayed.

Embodiment 4

Figure 11A:
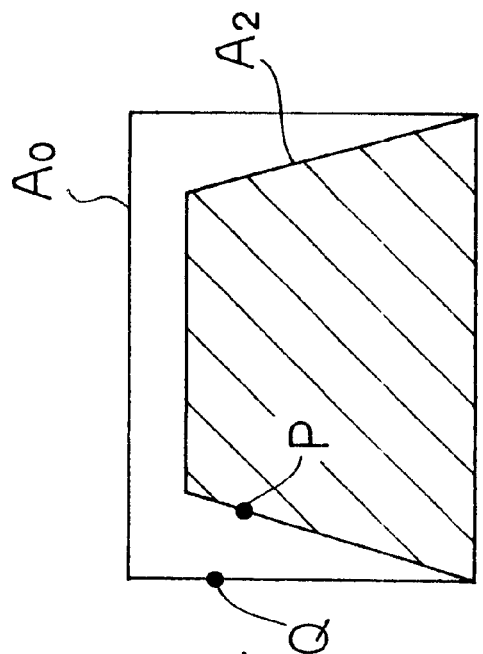
FIG. 11 (*a*) and FIG. 11(*b*) are illustrations showing the relation a normalized image among a normalized image, a distorted image projected onto a screen and an image for correcting a distortion.
Figure 11B:
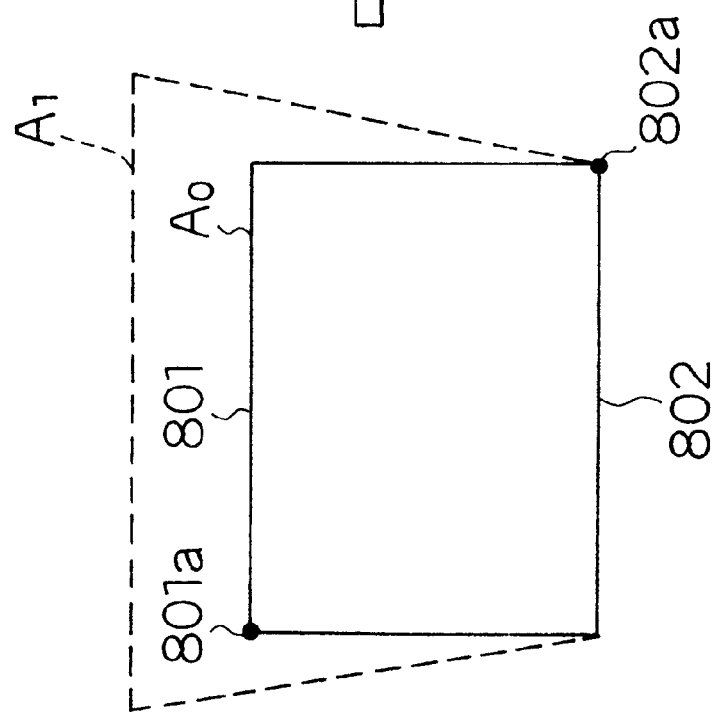
Figure 12A:
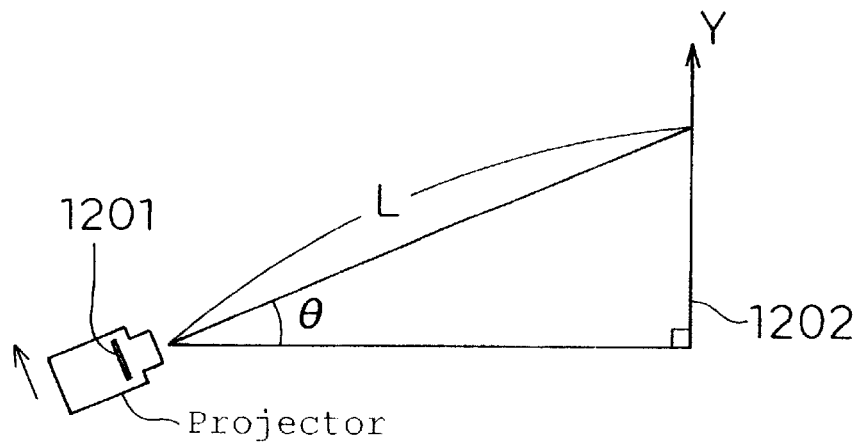
FIG. 12 (*a*) is an illustration showing the state in which a projection display is set, FIG. 12 (*b*) is an illustration showing an x-y coordinate system on a liquid-crystal panel, and FIG. 12(*c*) is an illustration showing an X-Y coordinate system on a screen.
Figure 12B:
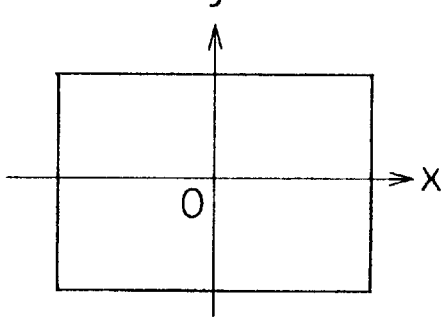
Figure 12C:
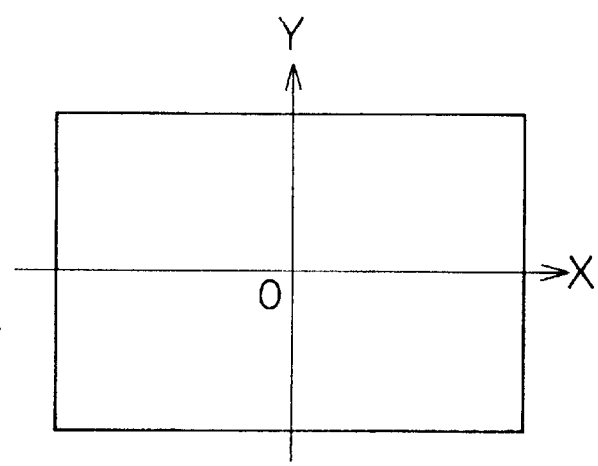

As for the above-described embodiments, the configuration of an image processing circuit capable of displaying a rectangular image A0 (refer to FIG. 11 (a)) free from trapezoidal distortion on a screen was described.

As for this embodiment, the configuration of a projection display for realizing the above operation will be described below by referring to the accompanying drawings, which displays an image in a small region designated by a user on images displayed on a screen by enlarging the image in the small region up to the entire surface of the screen.

Before describing the configuration of a specific image processing circuit for realizing the above mentioned, a basic concept for this embodiment will be described by referring to the accompanying drawings so that this embodiment can be easily understood.

Figure 6:
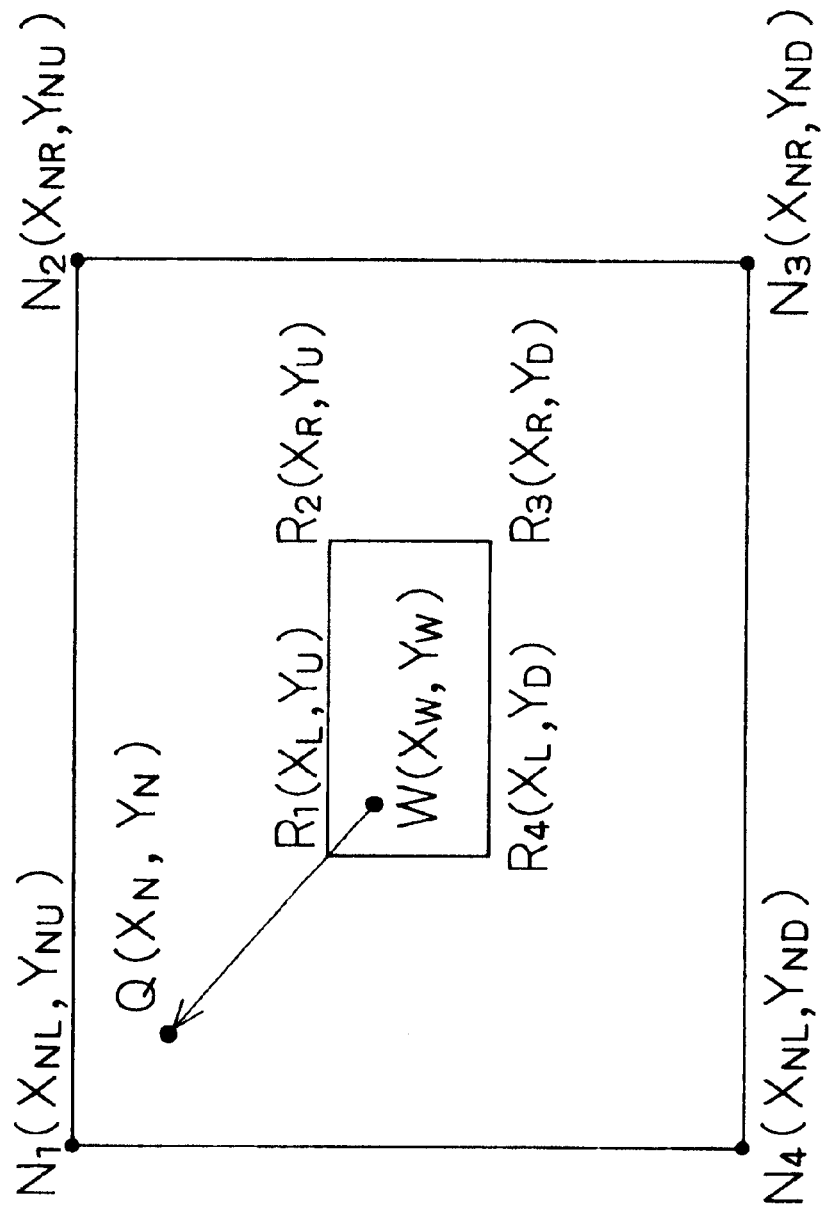
FIG. 6 is a conceptual view for explaining the positional relation between an image before enlarged (corresponding to an image in a designated region) and an image after enlarged on the screen of the embodiment 4 of the present invention.

FIG. 6 is a conceptual view for explaining the positional relation between the image before enlarged on the screen (corresponding to the image in the designated region) and the enlarged image.

That is, as shown in FIG. 6, to enlarge the image of a rectangle $R_1R_2R_3R_4$ to the image of a rectangle $N_1N_2N_3N_4$ on the screen, it is only necessary to perform linear transformation on the screen. Therefore, when it is assumed that the coordinate position of an optional point W on the rectangle $R_1R_2R_3R_4$ is (Xw,Yw) and that of a point Q on the enlarged rectangle $N_1N_2N_3N_4$ corresponding to the point W is $(X_N,Y_N)$ and coordinate positions of points of four corners of the rectangle $N_1N_2N_3N_4$ are shown in FIG. 6, a transformation formula according to enlargement is shown by the following expression (Equation 6).

$$X_N = \{(X_{NR} - X_{NL})/(X_R - X_L)\}X_W + \quad \text{[Equation 6]}$$
$$(X_{NR} \cdot X_L - X_{NL} \cdot X_R)/(X_L - X_R)$$
$$Y_N = \{(Y_{NR} - Y_{NL})/(Y_R - Y_L)\} \cdot Y_W +$$
$$(Y_{NR} \cdot Y_L - Y_{NL} \cdot Y_R)/(Y_L - Y_R)$$

Figure 7:
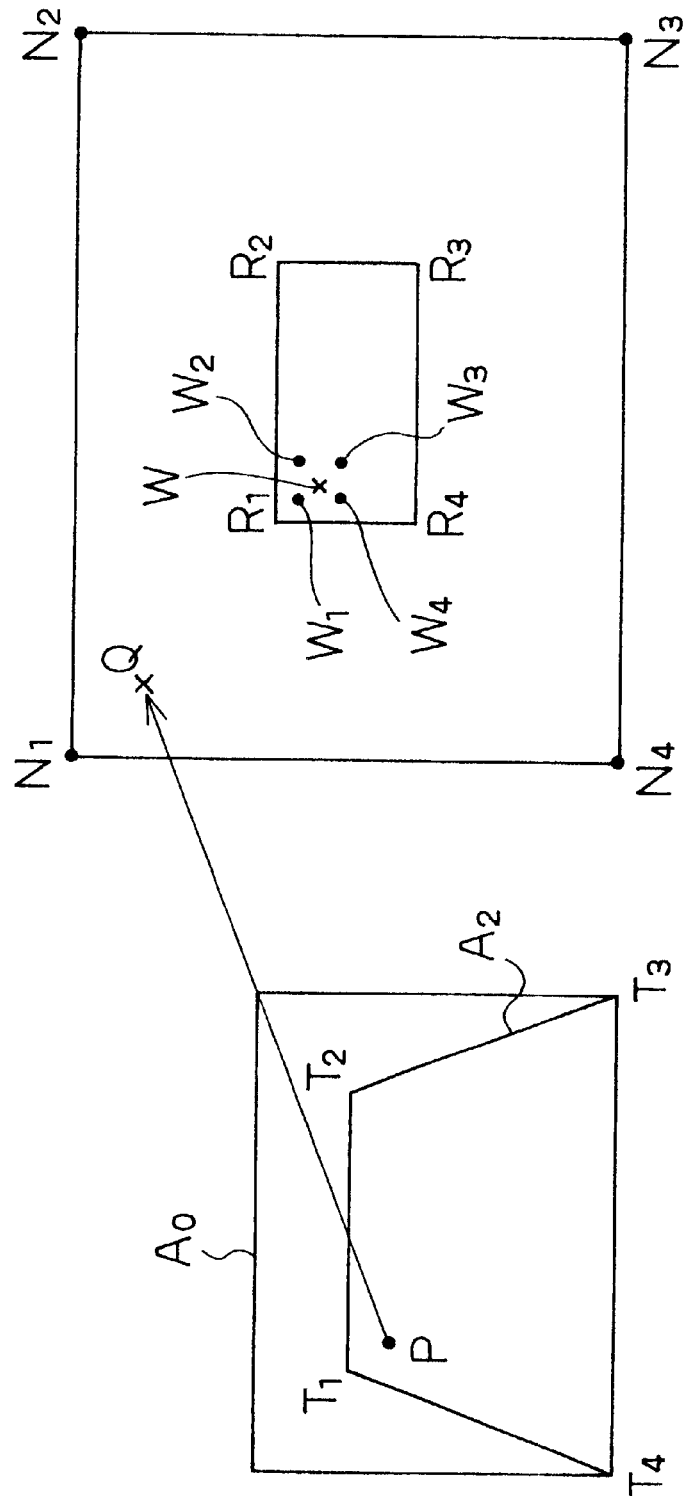
FIG. 7 is an illustration showing the relation of the embodiment 4 of the present invention between an existing pixel P on the liquid crystal display panel, projected point Q when the pixel P is projected onto a screen, and a corresponding point W before the point Q is enlarged.

On the other hand, as apparent from the description of the above embodiment, the point Q in FIG. 6 is a point on the projected image when a predetermined point P in the region of a trapezoid $T_1T_2T_3T_4$ on the liquid-crystal panel surface is projected as shown in FIG. 7. It is above described that points $T_1$ to $T_4$ of four corners of a trapezoidal region $A_2$ are projected to points $N_1$ to $N_4$ of four corners on the screen. A region $A_0$ shows the entire region of the liquid-crystal panel.

Therefore, as shown in FIG. 7, when a pixel P present on the liquid-crystal panel is projected to the point Q on the screen, it is possible to compute the position of the corresponding point W of the point Q before enlarged by using (Equation 1) which is a transformation formula from the liquid crystal display panel to the screen described in the section of Description of the prior art and the inverse transformation formula of the above (Equation 6).

Then, it is described below to obtain a pixel value to be written in the position of the pixel P on the liquid-crystal display panel in accordance with the coordinate position. (Xw,Yw) of the point W obtained through the above computation.

That is, to enlarge the image in the rectangle $R_1R_2R_3R_4$ on the screen designated by a user to the entire surface of the screen, it is preferable to generate all pixels in the enlarged rectangle $N_1N_2N_3N_4$ by using only the pixels in the rectangle $R_1R_2R_3R_4$ designated above when assuming that pixels of an image input to a frame memory 102 (refer to FIG. 8) to be described later are linearly assigned into the region of the rectangle $N_1N_2N_3N_4$.

Therefore, it is possible to obtain the pixel value and filter coefficient of the point W by specifying four pixels $W_1$ to $W_4$ closest to the coordinate position (Xw,Yw) of the point W obtained as described above out of the pixels of the input image assigned as described above and using the linear interpolation method same as the above (Formula 4). In this case, the pixel value of the point W becomes a pixel value to be written in the position of the pixel P described above.

Therefore, it is preferable to set the coordinates $w_1$ to $W_4$ of the four pixels closest to the point W obtained from the computation using the inverse transformation formula of the above (Formula 6) and (Formula 1) and corresponding to the pixel P in the region of the trapezoid $T_1T_2T_3T_4$ to a processing memory 105 to be described later as reference pixel coordinates to be stored before enlarge image processing. Moreover, it is preferable to set values derived from a linear interpolation formula as filter coefficients a1 to a4 to be similarly stored in accordance with the positional relation between the closest four pixels and the point W (Xw,Yw). These filter coefficients a1 to a4 can be obtained from the method described for FIG. 3.

In case of this embodiment, because the above value to be stored in the processing memory depends on the position of a region designated by a user, it is necessary to perform computation whenever the user designates a region and update set values already stored.

Then, a specific configuration for realizing this embodiment will be further described below.

Figure 8:
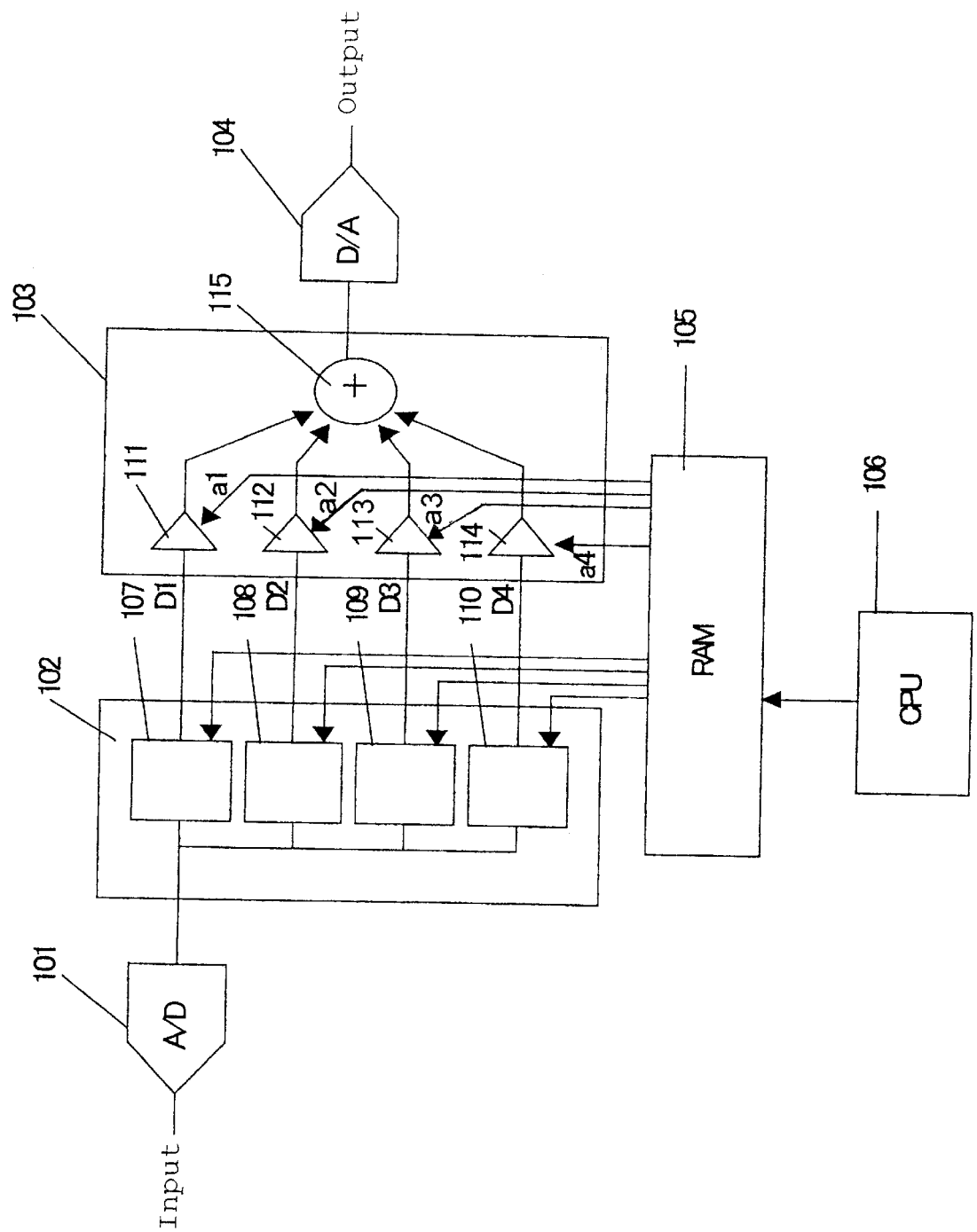
FIG. 8 is a block diagram of the image processing circuit of the embodiment 4 of the present invention.

FIG. 8 is a block diagram of the image processing circuit of embodiment 4 of the present invention. The configuration of this embodiment will be described below by referring to FIG. 8.

In FIG. 8, symbol 101 denotes an AD converter, 102 denotes a frame memory, 103 denotes a filter, 104 denotes a DA converter, 105 denotes a RAM serving as a processing memory, and 106 denotes a CPU.

The RAM 102 is divided into four blocks 107 to 110, in which four different read addresses can be designated. Read addresses for the blocks 107 to 110 of the RAM 102 and the filter coefficients al to a4 of the filter 103 configured by four multipliers 111 to 114 and one adder 115 are updated whenever a user designate a region and stored in the RAM 105.

As described above, as for this embodiment, a case will be described in which an image region designated on a screen by a user is enlarged through the linear interpolation method and displayed.

The coordinate position W necessary for enlargement (refer to FIG. 7) is computed for all pixels for one frame as described above. A method for obtaining the reference pixel coordinates $W_1$ to $W_4$ and filter coefficients a1 to a4 is already described.

And, these reference pixel coordinates and filter coefficients are computed by the CPU 106 and stored in the RAM 105 as described above. Data values $D_1$ to $D_4$ are shown by the reference pixel coordinates $W_1$ to $W_4$ and supplied from the RAM 102.

Then, the flow of a video signal in an image processor having the configuration shown in FIG. 8 will be described below.

An input video signal is converted into a digital value by the AD converter 101 and then, written in the frame memory. 102. The same data is written in the block-1 107 to block-4 110.

A read address for the frame memory 102 is outputted from the RAM 105. That is, to generate the data present at the coordinate position W for enlargement, it is necessary to read the data at the reference pixel coordinates $W_1$ to $W_4$ (for four pixels) around the coordinate position. Therefore, addresses for four pixels are outputted and thereby, the data values $D_1$ to $D_4$ for four pixels are simultaneously read out of the frame memory 102 and supplied to the filter 103.

At the same time as the above, the filter coefficients a1 to a4 are simultaneously read out of the RAM 105 and supplied to the filter 103. Therefore, filtered data is supplied to the DA converter 104 from the filter 103 and a video signal is generated.

When handling a digital video signal, the AD converter 101 and DA converter 104 can be omitted.

As for this embodiment, computation of reference pixel coordinates requiring a lot of operation time is previously performed to store the reference pixel coordinates in the RAM 105. Therefore, filtering can be made at a longer cycle time of the frame memory 102 and RAM 105. Therefore, it is possible to process a very-fine dynamic image at a high image quality.

Though this embodiment performs enlargement, the present invention also makes it possible to perform not only contraction of a very-fine dynamic image but also rotation and distortion correction of the image at a high image quality because arithmetic operation between optional pixels can be made.

For this embodiment, enlargement of an image is described. Moreover, it is needless to say that trapezoid correction for the above embodiments 1 and 2 can be performed by the circuit configuration shown in FIG. 8 similarly to the case of the above embodiments. In this case, it is necessary to previously store reference pixel coordinates and their filter coefficients necessary for trapezoid correction in a processing memory or previously store them in the memory by considering them so that they can be changed correspondingly to a setting condition.

Embodiment 5

As for this embodiment, a modification of an image processing circuit when enlarging and displaying an image region designated on a screen by a user through the linear interpolation method will be described similarly to the case of the above embodiments.

Figure 9:
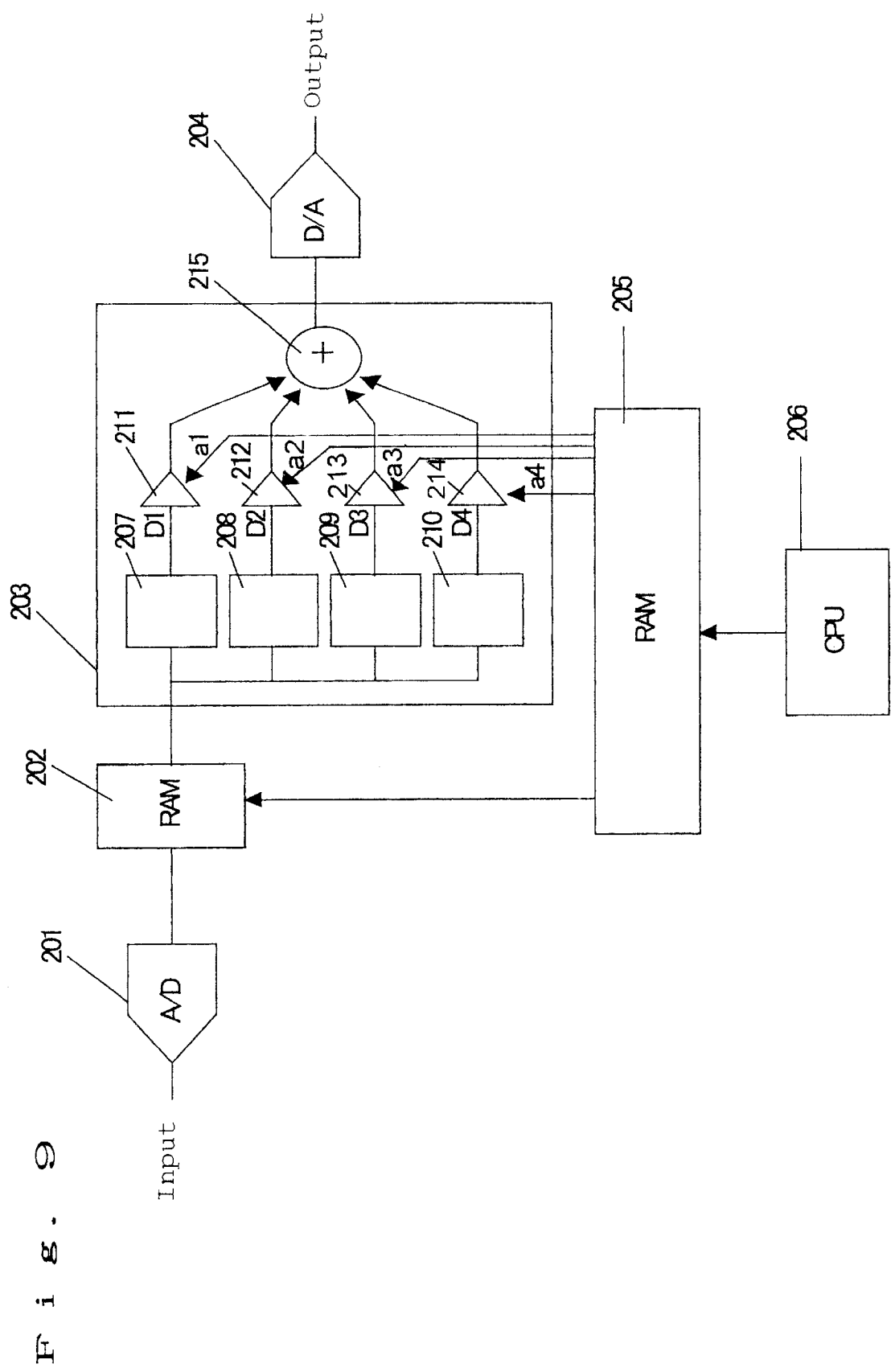
FIG. 9 is a block diagram of the image processing circuit of the embodiment 5 of the present invention.

FIG. 9 is a block diagram of the image processing circuit of embodiment 2 of the present invention.

In FIG. 9, symbol 201 denotes an AD converter, 202 denotes a frame memory, 203 denotes a filter, 204 denotes a DA converter, 205 denotes a RAM serving as a processing memory, 206 denotes a CPU, 207 denotes a register 1 of the filter 203, 208 denotes a register 2 of the filter 203, 209 denotes a register 3 of the filter 203, 210 denotes a register 4 of the filter 203, 211 denotes a multiplier 1 of the filter 203, 212 denotes a multiplier 2 of the filter 203, 213 denotes a multiplier 3 of the filter 203, 214 denotes a multiplier 4 of the filter 203, and 215 denotes an adder of the filter 203.

Similarly to the case of the embodiment 4, a read address for the frame memory 202 and filter coefficients a1 to a4 of the filter 203 serving as the coefficients of four multipliers 211 to 214 are updated whenever a user designates a region and stored in the RAM 205.

A method for obtaining reference pixel coordinates $W_1$ to $W_4$ and filter coefficients a1 to a4 is the same as the case of the embodiment 4.

Then, the flow of a video signal in an image processor having the configuration shown in FIG. 9 will be described below.

An input video signal is converted into a digital value by the AD converter 201 and then, written in the frame memory 202.

A read address for the frame memory 202 is outputted from the RAM 205. That is, to generate the data at a coordinate position W for enlargement, it is necessary to read the data at reference pixel coordinates $W_1$ to $W_4$ (for four pixels) around the coordinate position. Therefore, addresses for four pixels are successively outputted from four blocks, thereby data values $D_1$ to $D_4$ for the four pixels are successively read out of the frame memory 202, stored in the registers 207 to 210, and supplied to a filter 1003.

As the same time as the above, the filter coefficients a1 to a4 are simultaneously read out of the RAM 205 and supplied to the filter 203. Therefore, filtered data is supplied to the DA converter from the filter 203 and a video signal is generated.

When handling a digital video signal, the AD converter 201 and DA converter 204 can be omitted.

As for this embodiment, computation of reference pixel coordinates requiring a lot of operation time is previously performed and supplied to the RAM 205. Therefore, filtering can be made at a longer cycle time of the cycle time four times larger than that of the frame memory 202 or the cycle time of the RAM 205. By using a type of memory capable of performing burst access as the frame memory 202, it is possible to process an image at a higher speed. Thus, a very-fine dynamic image can be processed at a high image quality.

Though this embodiment performs enlargement, the present invention also makes it possible to perform not only contraction of a very-fine dynamic image but also rotation and distortion correction of the image at a high image quality because arithmetic operation between optional pixels can be made.

For this embodiment, enlargement of an image is described. Moreover, it is needless to say that trapezoid correction for the above embodiments 1and 2 can be performed by the circuit configuration shown in FIG. 9 similarly to the case of the above embodiments. In this case, it is necessary to previously store reference pixel coordinates and their filter coefficients necessary for trapezoid correction in a processing memory or previously store them in the memory by considering them so that they can be changed correspondingly to a setting condition.

Obviously, the operation of each means or step described in any of the above embodiments can be carried out by preparing and using a recording medium on which a program to cause a computer to execute the functions of all or part of each means or step described in any of the above-described embodiments is recorded.

What is claimed is:

1. An image processor comprising:
   frame memory means for storing pixel data for a first image;
   pixel-data generation means for generating pixel data for a second image in accordance with reference pixels on the first image;
   rule storing means for previously storing single or plural transformation rules which relate to a positional relation between a predetermined position on the first image and a pixel position on the second image;
   determining means for determining position-coordinate data for the reference pixels corresponding to the predetermined position, and weighted coefficients for determining rates for using the pixel data for the reference pixels, based on the transformation rule stored in the storing means; and
   processing-memory means for storing the position-coordinate data for the reference pixels, and the weighted coefficients correlating to each other, which are determined by the determining means,
   wherein the pixel-data generation means obtains the pixel data for the reference pixels read out of the frame-memory means by using values of the position-coordinate data for the reference pixels stored in the processing-memory means as read addresses and generates the pixel data for the second image in accordance with the obtained pixel data and the weighted coefficients read out of the processing-memory means.

2. The image processor according to claim 1, wherein the position-coordinate data values for the reference pixels are substantially simultaneously read out of the processing-memory means and the weighted coefficients are substantially simultaneously read out of the processing-memory means.

3. The image processor according to claim 2, wherein said determining means adjusts the rule based on a setting condition of the image processor.

4. An image processor comprising:
   frame memory means for storing pixel data for a first image;
   pixel-data generation means for generating the pixel data for a second image in accordance with reference pixels on the first image; and
   processing-memory means for previously storing position-coordinate data for the reference pixels determined in accordance with a relation between the first and second images,
   wherein the relation between the images represents a positional relation between a predetermined position on the first image and a pixel position on the second image, the reference pixels represent four pixels closest to and around the predetermined position, and generation of the pixel data for the second image represents generating the pixel data for a pixel position on the second image in accordance with the pixel data for the four pixels, and
   wherein the pixel-data generation means obtains the pixel data for the reference pixels read out of the frame-memory means by using values of the position-coordinate data for the reference pixels stored in the processing-memory means as read addresses and generates the pixel data for the second image in accordance with the obtained pixel data.

5. An image display comprising:
   frame-memory means for storing pixel data for a first image;
   pixel-data generation means for generating the pixel data for a second image in accordance with reference pixels on the first image;
   display means for displaying the generated second image;
   processing-memory means for previously storing position-coordinate data for the reference pixels determined in accordance with a relation between the first and second images, wherein the relation between the images represents a positional relation between a predetermined position on the first image and a pixel position on the second image, the reference pixels are four pixels closest to and around the predetermined position, and generation of the pixel data on the second image represents generating the pixel data for the pixel position on the second image in accordance with the pixel data for the four pixels, and wherein the pixel-data generation means obtains the pixel data for the reference pixels read out of the frame-memory means by using values of the position-coordinate data for the reference pixels stored in the processing-memory means as read addresses and generates the pixel data for the second image in accordance with the obtained pixel data.

6. An image display comprising:

frame-memory means for storing pixel data for a first image;

pixel-data generation means for generating pixel data for a second image in accordance with reference pixels on the first image;

display means for displaying the generated second image;

rule storing means for previously storing single or plural transformation rules which relate to a positional relation between a predetermined position on the first image and a pixel position on the second image;

determining means for determining position-coordinate data for the reference pixels corresponding to the predetermined position, and weighted coefficients for determining rates for using the pixel data for the reference pixels, based on the transformation rule stored in the storing means; and processing-memory means for storing the position-coordinate data for the reference pixels, and the weighted coefficients correlating to each other, which are determined by the determining means, wherein the pixel-data generation means obtains the pixel data for the reference pixels read out of the frame-memory means by using values of the position-coordinate data for the reference pixels stored in the processing-memory means as read addresses and generates the pixel data for the second image in accordance with the obtained pixel data and the weighted coefficients read out of the processing-memory means.

7. The image display according to claim 6, wherein the display means is a projection display.

8. The image display according to claim 6, wherein the display means has a dot-matrix structure.

9. The image display according to claim 6, wherein the second image is an image obtained by trapezoid-transforming the first image.

10. An image display comprising:

frame-memory means for storing pixel data for a first image;

pixel-data generation means for generating the pixel data for a second image in accordance with reference pixels on the first image;

display means for displaying the generated second image;

processing-memory means for previously storing position-coordinate data for the reference pixels determined in accordance with a relation between the first and second images, wherein the reference pixel is a pixel on the first image corresponding to a position in a region designated on an image displayed by the display means, and the pixel data for the second image is data used to display the image in the predetermined region in a region enlarged more than the designated region, and wherein the pixel-data generation means obtains the pixel data for the reference pixels read out of the frame-memory means by using values of the position-coordinate data for the reference pixels stored in the processing-memory means as read addresses and generates the pixel data for the second image in accordance with the obtained pixel data.

11. A medium having recorded thereon a program which is executed by a computer to implement functions of at least said pixel-data generation means described in any one of claims 1, to 2, 5 to 10, and 6.

* * * * *